(12) United States Patent
Bickham et al.

(10) Patent No.: US 8,380,031 B2
(45) Date of Patent: Feb. 19, 2013

(54) LOW NONLINEARITY LONG HAUL OPTICAL TRANSMISSION SYSTEM

(75) Inventors: Scott Robertson Bickham, Corning, NY (US); Margarita Rukosueva, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 216 days.

(21) Appl. No.: 13/070,834

(22) Filed: Mar. 24, 2011

(65) Prior Publication Data

US 2011/0236032 A1    Sep. 29, 2011

Related U.S. Application Data

(60) Provisional application No. 61/318,047, filed on Mar. 26, 2010.

(51) Int. Cl.
*G02B 6/00* (2006.01)

(52) U.S. Cl. ......................................................... 385/123
(58) Field of Classification Search .................... 385/123
See application file for complete search history.

(56) References Cited

U.S. PATENT DOCUMENTS

| | | | |
|---|---|---|---|
| 5,999,679 A * | 12/1999 | Antos et al. ................... | 385/127 |
| 6,671,445 B2 * | 12/2003 | Bickham et al. .............. | 385/127 |
| 6,780,861 B2 | 8/2004 | Nozulak ........................ | 514/249 |
| 6,959,136 B2 | 10/2005 | Mukasa ......................... | 385/124 |
| 6,959,137 B2 * | 10/2005 | Kalish et al. .................. | 385/127 |
| 6,983,094 B2 | 1/2006 | Mukasa ......................... | 385/127 |
| 7,570,857 B1 | 8/2009 | Bickham et al. .............. | 385/127 |
| 7,689,085 B1 | 3/2010 | Mishra .......................... | 385/127 |
| 8,081,854 B2 * | 12/2011 | Yoon et al. .................... | 385/124 |
| 2008/0279517 A1 | 11/2008 | Bickham et al. .............. | 385/124 |

OTHER PUBLICATIONS

"Low-loss dispersion-flattened hybrid transmission lines consisting of low-nonlinearity pure silica core fibres and dispersion compensating fibres"; Tsukitani et al; Electronics Letters, Jan. 6, 2000; vol. 36, No. 1.

* cited by examiner

*Primary Examiner* — Sung Pak
(74) *Attorney, Agent, or Firm* — Matthew J. Mason

(57) ABSTRACT

A long haul optical fiber transmission system includes a transmitter, a receiver optically coupled to the transmitter with at least two composite optical fiber spans, at least one amplifier between each composite optical fiber span, each composite optical fiber span having a length of at least 50 km. Each composite optical fiber span also includes a first optical fiber and a second optical fiber. When the second optical fiber has positive dispersion at a wavelength of 1550 nm, the composite optical fiber span has, at a wavelength of 1550 nm, an average attenuation of less than 0.180 dB/km. When the second optical fiber has negative dispersion at a wavelength of 1550 nm, the composite optical fiber span has, at a wavelength of 1550 nm, an average dispersion with a magnitude from about 2 to about 5 ps/nm/km, an average attenuation of less than 0.205 dB/km, and each composite optical fiber span has an average dispersion slope with a magnitude less than about 0.02 $ps/nm^2/km$.

20 Claims, 3 Drawing Sheets

LOW NONLINEARITY LONG HAUL OPTICAL TRANSMISSION SYSTEM

This application claims the benefit of, and priority to U.S. Provisional Patent Application No. 61/318,047 filed on Mar. 26, 2010 entitled, "Low Nonlinearity Long Haul Optical Transmission System", the content of which is relied upon and incorporated herein by reference in its entirety.

BACKGROUND

The disclosure relates generally to an optical transmission system and more particularly to an optical transmission system having low nonlinear optical effects. The transmission system is particularly applicable for long haul submarine transmission applications.

In long haul submarine transmission applications, it is not possible to transmit optical signals over very long distances without amplification due to attenuation. Accordingly, long haul submarine optical transmission systems include amplifiers repeated at certain distances along the length of the system. Because amplification equipment adds to the expense of the system, it is desirable to have as few amplifiers as possible per system length, while at the same time not adversely affecting the signal transmission characteristics of the system.

One possible strategy for reducing the number of amplifiers in a given system is to increase the amount of power launched into to the fiber at each amplification site. However, increasing the launch power above a certain threshold level for a given fiber (or combination of fibers) increases nonlinear optical effects such as four-wave mixing (FWM) and cross-phase modulation (XPM), such that optical signal transmission through long-haul optical networks becomes unsatisfactorily degraded. While dispersion reduces nonlinear effects such as FWM and XPM, the interplay of the accumulation of large amounts of chromatic dispersion and self-phase modulation (SPM) creates noise and distortion in the optical system.

Accordingly, a need exists for alternative long haul optical fiber transmission systems having increased length between amplifiers without adversely affecting the signal transmission characteristics of the system to unsatisfactory levels.

SUMMARY

One embodiment of the disclosure relates to a long haul optical transmission system. The system includes a transmitter comprising a modulated bit rate of at least 40 Gb/s. The system also includes a receiver optically coupled to the transmitter with at least two composite optical fiber spans, each composite optical fiber span having a length of at least 50 km. Each composite optical fiber span includes a first optical fiber optically coupled to the transmitter and comprising, at a wavelength of 1550 nm, an effective area Aeff$_1$ of greater than 120 µm$^2$, an attenuation $\alpha_1$ of less than 0.180 dB/km, a nonlinear refractive index $n_2^1$, and a length L$_1$ of at least 30 km. Each composite optical fiber span also includes a second optical fiber having a length L$_2$ of at least 20 km. When the second optical fiber has positive dispersion at a wavelength of 1550 nm, the composite optical fiber span has, at a wavelength of 1550 nm, an average attenuation of less than 0.180 dB/km. When the second optical fiber has negative dispersion at a wavelength of 1550 nm, the composite optical fiber span has, at a wavelength of 1550 nm, an average dispersion with a magnitude from about 2 to about 5 ps/nm/km, an average attenuation of less than 0.205 dB/km, and each composite optical fiber span has an average dispersion slope with a magnitude less than about 0.02 ps/nm$^2$/km. In addition, the system includes at least one amplifier between each composite optical fiber span.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
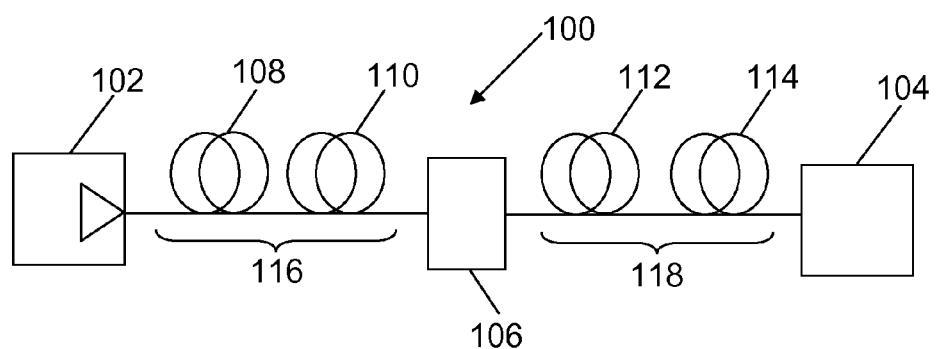
FIG. 1 schematically depicts a long haul optical fiber transmission system according to one or more embodiments shown and described herein.

Reference will now be made in detail to embodiments of long haul optical fiber transmissions systems, examples of which are illustrated in the accompanying drawings. Whenever possible, the same reference numerals will be used throughout the drawings to refer to the same or like parts.

As used herein, the effective area of an optical fiber is the area of the area of the optical fiber in which light is propagated and is defined as:

$$Aeff = 2\pi \frac{\left(\int_0^\infty E^2 r\,dr\right)^2}{\int_0^\infty E^4 r\,dr},$$

where E is the electric field associated with light propagated in the fiber and r is the radius of the fiber.

As used herein, the nonlinear phase shift in optical fiber i is defined as:

$$\phi_i = 10^{(P_i/10)} \left( \frac{n_2^i}{Aeff_i} \frac{4.343}{\alpha_i} \right) \left[ 1 - \exp\left( -\frac{\alpha_i L_i}{4.343} \right) \right],$$

where $P_i$ is the attenuation in dB between the transmitter and the input of fiber i, $n_2^i$ is the nonlinear refractive index in $10^{-20}$ m$^2$/W, $Aeff_i$ is the effective area in μm$^2$, $\alpha_i$ is the attenuation in dB/km, and $L_i$ is the length of fiber i in km.

One embodiment of a long haul optical fiber transmission system is depicted in FIG. 1. The long haul optical fiber transmission system 100 includes a transmitter 102 optically coupled to a receiver 104 with first and second composite optical fiber spans 116, 118. An amplifier 106 is positioned between the spans. The transmitter 102 produces an optical output signal with a modulated bit rate of 40 Gb/s. In one embodiment (not shown) the transmitter 102 may comprise a Raman amplifier and/or erbium doped fiber amplifier (EDFA) optically coupled to the composite optical fiber span 106.

In the embodiment shown in FIG. 1, each composite optical fiber span includes a first optical fiber and a second optical fiber. Specifically, first composite optical fiber span 116 includes a first optical fiber 108 and second optical fiber 110 and second composite optical fiber span 118 includes a first optical fiber 112 and a second optical fiber 114. The first optical fiber in each optical fiber span has an effective area $Aeff_1$, a nonlinear refractive index $n_2^1$, an attenuation $\alpha_1$ and a length $L_1$. In the embodiments described herein, the effective area $Aeff_1$ at a wavelength of 1550 nm of the first optical fiber in each optical fiber span is preferably greater than 120 μm$^2$, more preferably greater than 125 μm$^2$ and even more preferably greater than 130 μm$^2$, and most preferably, 135 μm$^2$ or greater. The attenuation $\alpha_1$ of the first optical fiber in each optical fiber span at a wavelength of 1550 nm is preferably less than 0.180 dB/km, more preferably, less than 0.175 dB/km, and even more preferably, less than 0.170 dB/km. The nonlinear refractive index $n_2^1$, of the first optical fiber in each optical fiber span is preferably less than $2.2 \times 10^{-20}$ m$^2$/W, more preferably less than $2.15 \times 10^{-20}$ m$^2$/W. In the embodiments described herein the length $L_1$ is preferably at least 30 km, more preferably at least 40 km, and even more preferably at least 50 km, such as from 30 km to 60 km.

In one embodiment, the first optical fiber in each optical fiber span may be an optical fiber as described in U.S. patent application Ser. No. 12/362,694 entitled "Large Effective Area Fiber With Ge-Free Core" filed Jan. 30, 2009, the entirety of which is herein incorporated by reference. Such an optical fiber may have a compound core comprising an inner core region, an annular core region surrounding and directly adjacent to the central core region, and a fluorine doped second annular region surrounding and directly adjacent to the first annular core region. The compound core may be surrounded by a cladding. The dimensions and specific relative refractive indices of the compound core and cladding are disclosed in the aforementioned patent application. The dimensions and composition of the optical fiber may be selected such that the first optical fiber in each optical fiber span has an effective area of greater than 120 μm$^2$ at a wavelength of 1550 nm as described above.

Still referring to FIG. 1, the second optical fiber in each optical fiber span may, in one or more embodiments, have positive dispersion at a wavelength of 1550 nm or, may in one more alternative embodiments, have negative dispersion at a wavelength of 1550 nm. Preferably, the second optical fiber in each optical fiber span has a length $L_2$ of at least 20 km, more preferably at least 30 km, and even more preferably at least 40 km, such as from 20 km to 50 km. Preferably, the combined length of the first and second optical fibers (i.e., $L_1+L_2$) in each composite optical fiber span is at least 50 km, more preferably at least 60 km, and even more preferably at least 70 km, such as from 50 km to 100 km, and further such as from 60 km to 100 km.

When the second optical fiber in each optical fiber span has positive dispersion at a wavelength of 1550 nm, the second optical fiber is preferably selected to provide a composite optical fiber span having, at a wavelength of 1550 nm, an average attenuation of less than 0.180 dB/km, more preferably less than 0.175 dB/km, and even more preferably less than 0.170 dB/km including splice losses. Preferably, the combined length of the first and second optical fibers (i.e., $L_1+L_2$) in each composite optical fiber span is at least 50 km, more preferably at least 60 km, and even more preferably at least 70 km, such as from 50 km to 120 km, and further such as from 60 km to 120 km.

When the second optical fiber in each optical fiber span has positive dispersion at a wavelength of 1550 nm, the second optical fiber may preferably have, at a wavelength of 1550 nm, an effective area greater than 70 μm$^2$, preferably greater than 100 μm$^2$ and more preferably greater than 120 μm$^2$. The second optical fiber has an attenuation of less than 0.170 dB/km and even more preferably less than 0.165 dB/km. The second optical fiber may in one embodiment, be formed from Vascade® EX1000 optical fiber manufactured by Corning, Inc. The EX1000 optical fiber has, at a wavelength of 1550 nm, an effective area of about 78 μm$^2$ and an attenuation of about 0.164 dB/km. Alternatively, the second optical fiber may be formed from Vascade® EX2000 optical fiber manufactured by Corning, Inc. The EX2000 optical fiber has, at a wavelength of 1550 nm, an effective area of about 112 μm$^2$ and an attenuation of about 0.162 dB/km.

When the second optical fiber in each optical fiber span has negative dispersion at a wavelength of 1550 nm, the second optical fiber is preferably selected to provide a composite optical fiber span having, at a wavelength of 1550 nm, an average dispersion with a magnitude from about 2 to about 5 ps/nm/km, an average attenuation of less than 0.205 dB/km and more preferably less than 0.200 dB/km, including splice losses. In addition, the second optical fiber is preferably selected such that each composite optical fiber span has an average dispersion slope with a magnitude less than about 0.02 ps/nm$^2$/km, more preferably less than 0.015 ps/nm$^2$/km, and even more preferably less than 0.01 ps/nm$^2$/km. The average dispersion and average dispersion slope of the composite fiber span are both preferably negative.

When the second optical fiber in each optical fiber span has negative dispersion at a wavelength of 1550 nm, the second optical fiber may, in one embodiment, be an optical fiber as described in U.S. Pat. No. 7,570,857 entitled "Low Bend Loss Dispersion Slope Compensating Optical Fiber" the entirety of which is herein incorporated by reference. Such an optical fiber may have a compound core comprising an inner core region and a fluorine doped annular region surrounding and directly adjacent to the inner core region. The fluorine doped annular region may be surrounded by a flattened region and a raised index region, which may, in turn, be surrounded by a cladding region that includes a first annular cladding region and a depressed index second annular cladding region. The dimensions and specific relative refractive indices of the compound core and cladding are disclosed in the aforementioned patent. The dimensions and composition of the second optical fiber may be selected such that the second optical fiber preferably has, at a wavelength of 1550 nm, a total dispersion of less than −30 ps/nm/km, an attenuation of less than 0.25 dB/km, and an effective area of greater than 25 nm$^2$, preferably greater than 30 nm², and even more preferably greater than 35 nm², such as from 25 to 40 nm².

In preferred embodiments, transmitter 102 comprises a modulated bit rate of at least 40 Gb/s, more preferably at least 100 Gb/s.

In preferred embodiments, amplifier 106 comprises at least one Raman pump laser operating at a wavelength between 1400 and 1500 nm which may be used to reverse pump the composite optical fiber span thereby amplifying and improving the quality of the optical signal.

Receiver 104 may further comprise an erbium doped fiber amplifier (not shown) and/or a Raman amplifier (not shown) which may be used to reverse pump the composite optical fiber span thereby amplifying and improving the quality of the optical signal received by the receiver 104.

Figure 2:
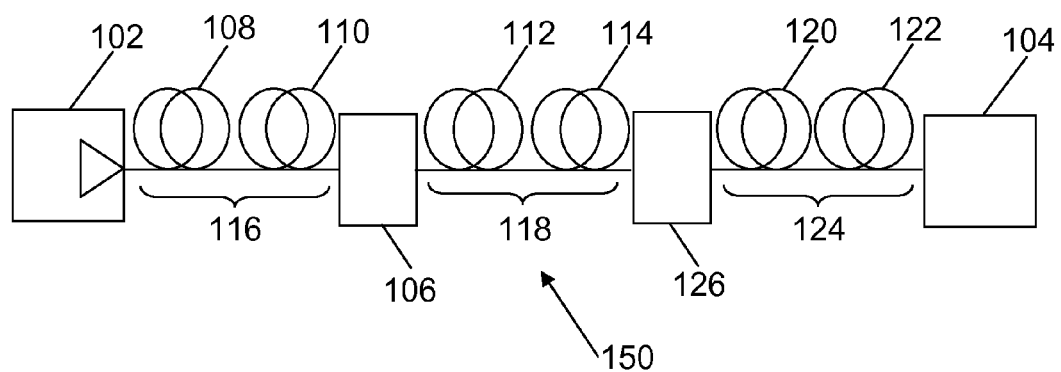
FIG. 2 schematically depicts a long haul optical fiber transmissions system according to one or more embodiments shown and described herein.

While FIG. 1 shows two composite optical fiber spans, embodiments disclosed herein also include those having more than two composite optical fiber spans. FIG. 2 shows an embodiment of a long haul optical fiber transmission system 150 having first composite optical fiber span 116, second composite optical fiber span 118, and third composite optical fiber span 124. Amplifiers 106 and 126 are positioned between the spans. Each composite optical fiber span includes a first optical fiber and a second optical fiber. Specifically, first composite optical fiber span 116 includes a first optical fiber 108 and second optical fiber 110, second composite optical fiber span 118 includes a first optical fiber 112 and a second optical fiber 114, and third composite optical fiber span 124 includes a first optical fiber 120 and a second optical fiber 122. First optical fiber and second optical fiber in each optical fiber span can be the same as described above. For example, first optical fiber in each optical fiber span can be an optical fiber as described in U.S. patent application Ser. No. 12/362,694 and second optical fiber in each optical fiber span can be an optical fiber having positive dispersion at a wavelength of 1550 nm, such as Vascade® EX1000 or Vascade® EX2000 optical fiber, or second optical fiber in each optical fiber span can be an optical fiber having negative dispersion at a wavelength of 1550 nm, such as an optical fiber as described in U.S. Pat. No. 7,570,857.

Embodiments illustrated in FIG. 2 include those in which the second optical fiber in each composite optical fiber span has positive dispersion at a wavelength of 1550 nm and those in which the second optical fiber in each composite optical fiber span has negative dispersion at a wavelength of 1550 nm. Embodiments illustrated in FIG. 2 also include those in which at least one composite optical fiber span comprises a second optical fiber having positive dispersion at a wavelength of 1550 nm and at least one composite optical fiber span comprises a second optical fiber having negative dispersion at a wavelength of 1550 nm. In addition, embodiments illustrated in FIG. 2 include those in which composite one optical fiber span comprises a second optical fiber having positive dispersion at a wavelength of 1550 nm and two composite optical fiber spans comprise a second optical fiber having negative dispersion at a wavelength of 1550 nm. Embodiments illustrated in FIG. 2 further include those in which two composite optical fiber spans comprise a second optical fiber having positive dispersion at a wavelength of 1550 nm and one composite optical fiber span comprises a second optical fiber having negative dispersion at a wavelength of 1550 nm.

For example, in a preferred embodiment, first composite optical fiber span 116 comprises a second optical fiber 110 having negative dispersion at a wavelength of 1550 nm, second optical fiber span 118 comprises a second optical fiber 114 having positive dispersion at a wavelength of 1550 nm, and third optical fiber span 124 comprises a second optical fiber 122 having negative dispersion at a wavelength of 1550 nm.

Embodiments disclosed herein also include those having more than three composite optical fiber spans. For example, embodiments disclosed herein include those having at least five composite optical fiber spans, at least ten composite optical fiber spans, and at least twenty composite optical fiber spans wherein at least one amplifier is positioned between each composite optical fiber span. Such embodiments include those in which the second optical fiber in each composite optical fiber span has positive dispersion at a wavelength of 1550 nm and those in which the second optical fiber in each composite optical fiber span has negative dispersion at a wavelength of 1550 nm. Such embodiments also include those in which at least one composite optical fiber span comprises a second optical fiber having positive dispersion at a wavelength of 1550 nm and at least one composite optical fiber span comprises a second optical fiber having negative dispersion at a wavelength of 1550 nm. For example, preferred embodiments include those in which at least two composite optical fiber spans, preferably at least three composite optical fiber spans, and more preferably at least five optical fiber spans are arranged consecutively on both sides of a composite optical fiber span comprising a second optical fiber having positive dispersion at a wavelength of 1550 nm with an amplifier between each composite optical fiber span, wherein the second optical fiber in each composite optical fiber span arranged consecutively on both sides of the composite optical fiber span comprising a second optical fiber having positive dispersion at a wavelength of 1550 nm has negative dispersion at a wavelength of 1550 nm.

Spans having composite optical fibers as described above can enable a higher amount of power to be launched into the optical fiber span without introducing substantial nonlinear penalties into the first fiber of the span, which can, in turn, enable an increased span length, thereby reducing system cost by lowering the number of repeater pods needed for a given system length.

Figure 3:
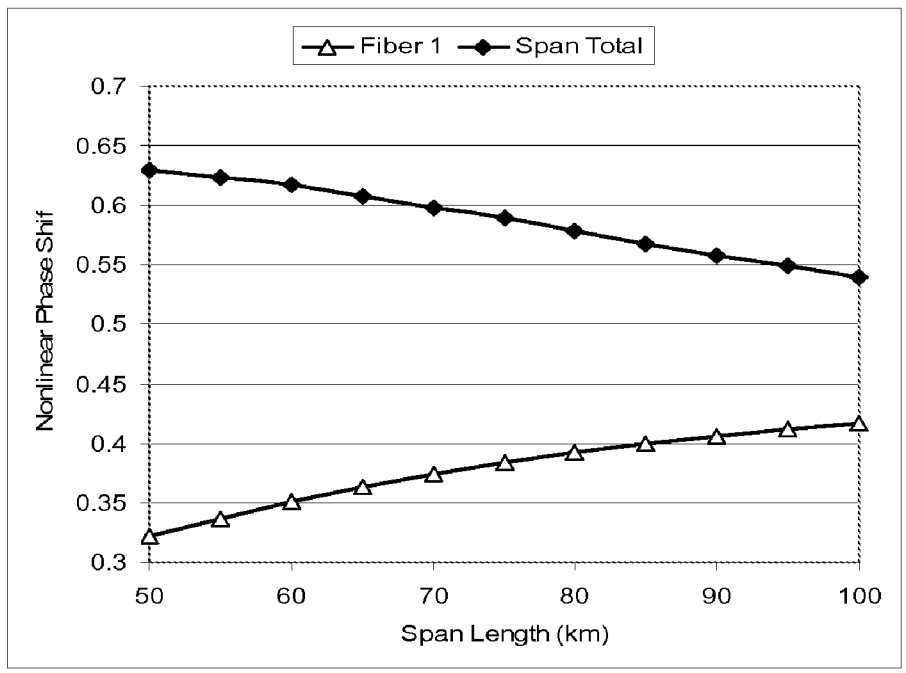
FIG. 3 graphically depicts the nonlinear phase shift in composite optical fiber spans wherein the first optical fiber has positive dispersion and the second optical fiber is a dispersion compensating optical fiber.

When the second optical fiber in the span is a dispersion compensating optical fiber as described in U.S. Pat. No. 7,570,857 referenced herein, composite spans with low nonlinearity can be obtained. FIG. 3 graphically depicts the modeled nonlinear phase shift in the first optical fiber of composite optical fiber spans wherein the first optical fiber has a dispersion of 20.5 ps/nm/km, a dispersion slope of 0.062 ps/nm²/km, an effective area of 120 μm², a nonlinear refractive index of 2.15 m²/W, and an attenuation of 0.170 dB/km, all at 1550 nm. The second fiber is a dispersion compensating optical fiber with a dispersion of −39.5 ps/nm/km, a dispersion slope of −0.12 ps/nm²/km, an effective area of 27 μm², a nonlinear refractive index of 2.6 m²/W, and an attenuation of 0.237 dB/km, all at 1550 nm. The total splice loss in the composite span is 0.4 dB, and the average dispersion and dispersion slope of the composite span are −3 ps/nm/km and −0.009 ps/nm²/km, respectively, at 1550 nm. As can be seen from FIG. 3, when the first optical fiber in the span has, at a wavelength of 1550 nm, an effective area greater than 120 μm², which can be provided by optical fiber disclosed in U.S. patent application Ser. No. 12/362,694 referenced herein, the nonlinear phase shift of the composite optical fiber span is less than 0.65 for span lengths greater than 50 km and less than 0.60 for span lengths greater or equal to 70 km.

Figure 4:
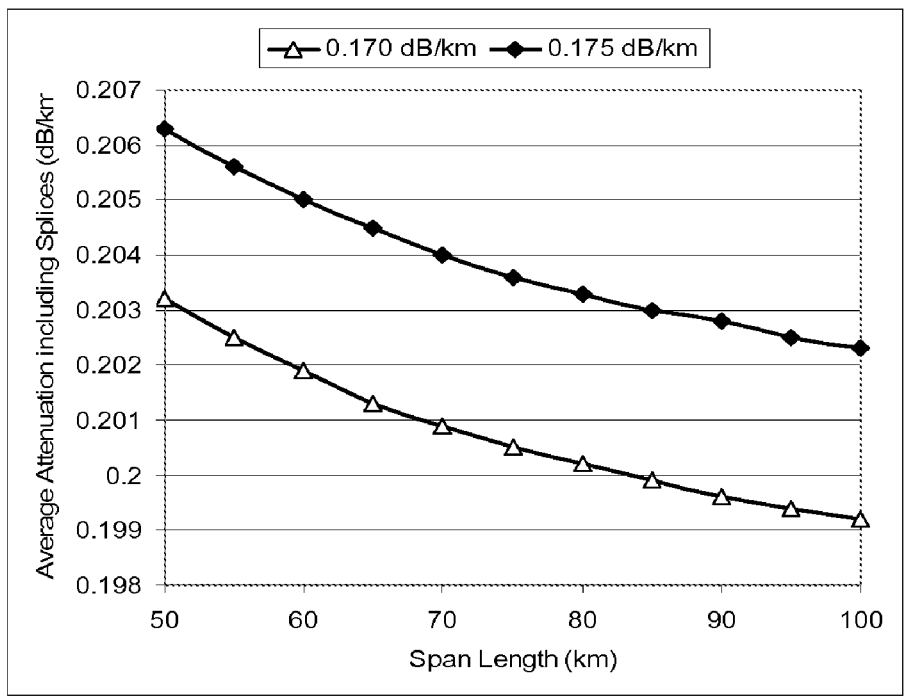
FIG. 4 graphically depicts the average attenuation of composite optical fiber spans wherein the first optical fiber has positive dispersion and the second optical fiber is a dispersion compensating optical fiber.

FIG. 4 graphically depicts the average attenuation of composite optical fiber spans wherein the first optical fiber has positive dispersion, the second optical fiber is a dispersion compensating optical fiber and the total splice loss of the composite span is 0.4 dB. As can be seen from FIG. 4, when the attenuation of the first optical fiber is less than or equal to 0.175 dB/km at 1550 nm, the average attenuation of the composite span is less than 0.207 dB/km for span lengths greater than 50 km, less than 0.205 dB/km for span lengths greater than 60 km, and less than 0.203 dB/km for span lengths greater than 85 km. When the attenuation of the first optical fiber is less than or equal to 0.170 dB/km at 1550 nm, the average attenuation of the composite span is less than 0.205 dB/km for span lengths greater than 50 km, less than 0.202 dB/km for span lengths greater than 60 km, and less than 0.200 dB/km for span lengths greater than 85 km.

Figure 5:
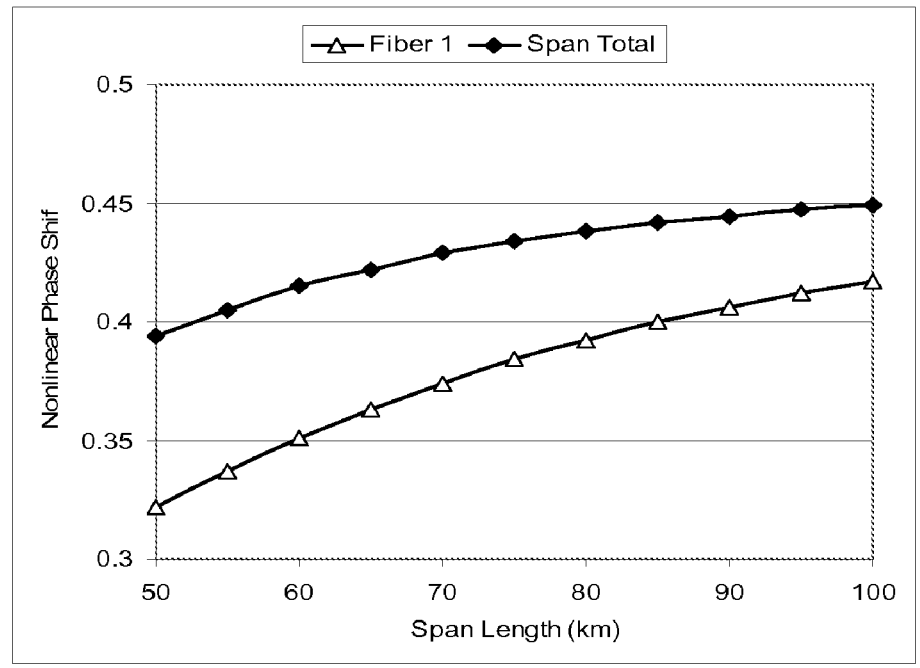
FIG. 5 graphically depicts the nonlinear phase shift in composite optical fiber spans wherein the first optical fiber has positive dispersion and the second optical fiber has positive dispersion.

FIG. 5 graphically depicts the nonlinear phase shift in the first optical fiber of composite optical fiber spans wherein the first optical fiber has a dispersion of 20.5 ps/nm/km, a dispersion slope of 0.062 ps/nm$^2$/km, an effective area of 120 μm$^2$, a nonlinear refractive index of 2.15 m$^2$/W, and an attenuation of 0.170 dB/km, all at 1550 nm. The second fiber has a dispersion of 19.5 ps/nm/km, a dispersion slope of 0.060 ps/nm$^2$/km, an effective area of 112 μm$^2$, a nonlinear refractive index of 2.15 m$^2$/W, and an attenuation of 0.165 dB/km, all at 1550 nm. The total splice loss in the composite span is 0.25 dB. As can be seen from FIG. 5, when the first optical fiber in the span has, at a wavelength of 1550 nm, an effective area greater than 120 μm$^2$, which can be provided by optical fiber disclosed in U.S. patent application Ser. No. 12/362,694 referenced herein, the nonlinear phase shift of the composite optical fiber span is less than 0.45 for span lengths less than 100 km.

Figure 6:
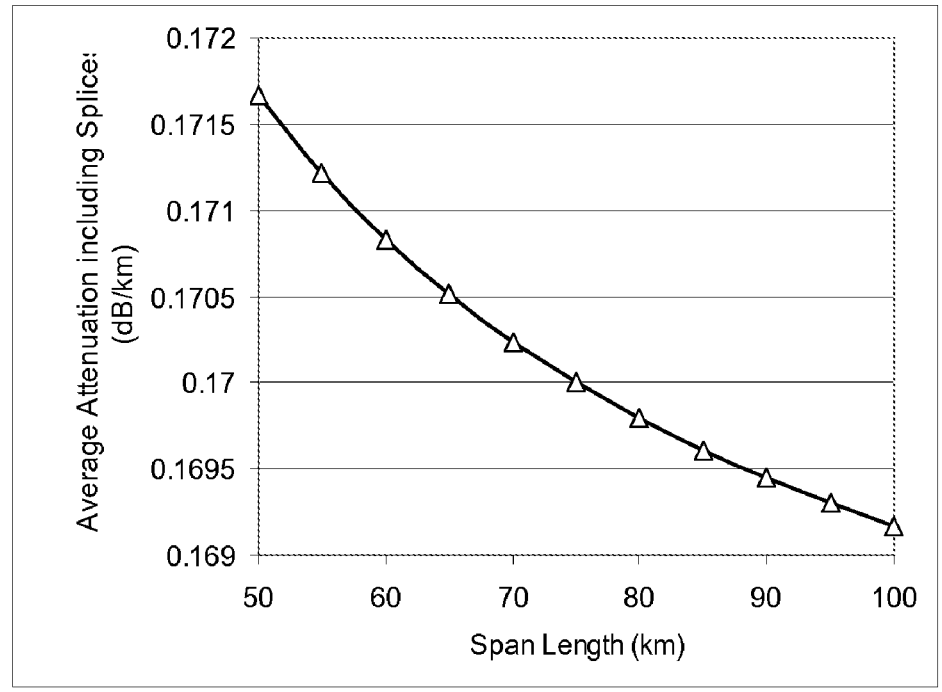
FIG. 6 graphically depicts the average attenuation of composite optical fiber spans wherein the first optical fiber has positive dispersion and the second optical fiber has positive dispersion.

FIG. 6 graphically depicts the average attenuation of composite optical fiber spans wherein the first optical fiber has positive dispersion and an attenuation of 0.170 dB/km at 1550 nm, and the second optical fiber has positive dispersion and an attenuation of 0.165 dB/km at 1550 nm. The first optical fiber comprises 62% of the length of the composite span, and the total splice loss is 0.25 dB. As can be seen from FIG. 6, the average attenuation of the composite span is less than 0.175 dB/km for span lengths greater than 50 km and less than 0.170 dB/km for span lengths greater than 75 km.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A long haul optical transmission system comprising:
a transmitter comprising a modulated bit rate of at least 40 Gb/s;
a receiver optically coupled to the transmitter with at least two composite optical fiber spans, each composite optical fiber span having a length of at least 50 km and comprising:
a first optical fiber optically coupled to the transmitter and comprising, at a wavelength of 1550 nm, an effective area Aeff$_1$ of greater than 120 μm$^2$, an attenuation α$_1$ of less than 0.180 dB/km, a nonlinear refractive index n$_2^1$, and a length L$_1$ of at least 30 km;
a second optical fiber optical fiber optically coupled to the first optical fiber, wherein the second optical fiber has a length L$_2$ of at least 20 km and wherein:
when the second optical fiber has positive dispersion at a wavelength of 1550 nm, the composite optical fiber span has, at a wavelength of 1550 nm, an average attenuation of less than 0.180 dB/km; and
when the second optical fiber has negative dispersion at a wavelength of 1550 nm, the composite optical fiber span has, at a wavelength of 1550 nm, an average dispersion with a magnitude from about 2 to about 5 ps/nm/km, an average attenuation of less than 0.205 dB/km, and each composite optical fiber span has an average dispersion slope with a magnitude less than about 0.02 ps/nm$^2$/km;
and wherein the system comprises at least one amplifier between each composite optical fiber span.

2. The system of claim 1, wherein the system comprises at least three optical fiber spans and at least one amplifier between each composite optical fiber span.

3. The system of claim 2, wherein at least one optical fiber span comprises a second optical fiber having positive dispersion at a wavelength of 1550 nm and at least two optical fiber spans comprise a second optical fiber having negative dispersion at a wavelength of 1550 nm.

4. The system of claim 3, wherein a first optical fiber span comprises a second optical fiber having negative dispersion at a wavelength of 1550 nm, a second optical fiber span comprises a second optical fiber having positive dispersion at a wavelength of 1550 nm, and a third optical fiber span comprises a second optical fiber having negative dispersion at a wavelength of 1550 nm, wherein the first, second, and third optical fiber spans are arranged consecutively.

5. The system of claim 1, wherein the system comprises at least ten composite optical fiber spans and at least one amplifier between each composite optical fiber span.

6. The system of claim 1, wherein each composite optical fiber span has a length of at least 60 km.

7. The system of claim 1, wherein each composite optical fiber span has a length of at least 70 km.

8. The system of claim 1, wherein Aeff$_1$ is greater than 130 μm$^2$.

9. The system of claim 1 wherein the nonlinear refractive index n$_2^1$ of the first optical fiber is less than $2.2 \times 10^{-20}$ m$^2$/W.

10. The system of claim 1, wherein the transmitter comprises a modulated bit rate of at least 100 Gb/s.

11. The system of claim 1, wherein the amplifier comprises at least one Raman pump laser operating at a wavelength between 1400 and 1500 nm.

12. The system of claim 1, wherein when the second optical fiber has positive dispersion at a wavelength of 1550 nm, the composite optical fiber span has, at a wavelength of 1550 nm, an average attenuation of less than 0.175 dB/km.

13. The system of claim 1, wherein when the second optical fiber has positive dispersion at a wavelength of 1550 nm, the composite optical fiber span, has, at a wavelength of 1550 nm, an average attenuation of less than 0.170 dB/km.

14. The system of claim 1, wherein the second optical fiber in each composite optical fiber span has positive dispersion at a wavelength of 1550 nm.

15. The system of claim 1, wherein the second optical fiber in each composite optical fiber span has negative dispersion at a wavelength of 1550 nm.

16. The system of claim 1, wherein when the second optical fiber has negative dispersion at a wavelength of 1550 nm, the composite optical fiber span has, at a wavelength of 1550 nm, an average attenuation of less than 0.200 dB/km.

17. The system of claim 1, wherein when the second optical fiber has negative dispersion at a wavelength of 1550 nm, the composite optical fiber span has an average dispersion slope with a magnitude less than about 0.015 ps/nm$^2$/km.

18. The system of claim 1, wherein when the second optical fiber has negative dispersion at a wavelength of 1550 nm, the composite optical fiber span has an average dispersion slope with a magnitude less than about 0.01 ps/nm$^2$/km.

19. The system of claim 14, wherein the nonlinear phase shift of each composite optical fiber span is less than 0.45 when the length of each span is less than 100 km.

20. The system of claim 15, wherein the nonlinear phase shift of each composite optical fiber span is less than 0.65.

* * * * *